United States Patent [19]

Sato

[11] Patent Number: 5,381,268

[45] Date of Patent: Jan. 10, 1995

[54] COMPACT WIDE ANGLE ZOOM LENS

[75] Inventor: Haruo Sato, Kawasaki, Japan

[73] Assignee: Nikon Corporation, Tokyo, Japan

[21] Appl. No.: 24,221

[22] Filed: Mar. 1, 1993

[30] Foreign Application Priority Data

Mar. 5, 1992 [JP] Japan .................. 4-047446

[51] Int. Cl.⁶ .............................. G02B 15/14
[52] U.S. Cl. ..................... 359/691; 359/682
[58] Field of Search ............... 359/680, 681, 682, 691

[56] References Cited

U.S. PATENT DOCUMENTS 4,400,064  8/1983  Ikemori et al. ............... 359/681
4,560,253 12/1985  Ogino ........................... 359/682

FOREIGN PATENT DOCUMENTS 61-42246  9/1979  Japan.
62-94812  5/1987  Japan.

Primary Examiner—Scott J. Sugarman
Attorney, Agent, or Firm—Shapiro and Shapiro

[57] ABSTRACT

A wide angle zoom lens comprises a first lens group having a negative overall refracting power and a second lens group having a positive overall refracting power disposed in the named order from the object side, in which a magnification change is carried out by changing an air gap between the two lens groups. The first lens group comprises a negative meniscus lens convex on the object side and a positive lens convex on the object side disposed in the named order from the object side. The negative meniscus lens has at least one aspherical surface thereon. The second lens group comprises at least a positive lens, a positive lens, a negative lens having a concave surface with a large curvature on the image side, and a positive lens. The wide angle zoom lens is arranged to satisfy various conditions.

26 Claims, 3 Drawing Sheets

COMPACT WIDE ANGLE ZOOM LENS

BACKGROUND OF THE INVENTION

1. Field of the Invention

The present invention relates to a zoom lens, and more particularly to a compact wide angle zoom lens composed of a reduced number of constituent lenses.

2. Related Background Art

Miniaturization and high performance tendency have recently been accelerated especially in the field of super wide angle lens and wide angle zoom lens among interchangeable lenses for 35 mm still camera. Particularly, there are various proposals made for achieving a compact, inexpensive wide angle zoom lens, among which the most suitable type of lens is a zoom lens composed of two lens groups being a negative lens group and a positive lens group. Further, the recent technology employs an aspherical surface to achieve miniaturization, higher performance, and cost reduction of zoom lens. An example of such a lens is disclosed in Japanese Laid-open Patent Application No. 62-94812. In addition, Japanese Patent Publication No. 61-42246 and U.S. Pat. No. 4,560,253 disclose another example of the zoom lens of two lens group type, which is inexpensive and compact in a simple structure with a negative first lens group being composed of a negative lens and a positive lens.

The zoom lens as disclosed in above Japanese Laid-open Patent Application No. 62-94812 is a wide angle zoom lens composed of a reduced number of constituent lenses, which has a field angle of about 8°, an f-number of about 4, and a variable power (magnification change) ratio of about 2. In the zoom lens, however, the first lens group is composed of three lenses, which are negative, negative, and positive, respectively, in refracting power, which is insufficient in respect of miniaturization and cost reduction. There is, therefore, a strong desire to have a high performance wide angle zoom lens which is more compact and inexpensive.

To accomplish the miniaturization, there are conceivably possible methods of increasing the refracting power of each lens group and of decreasing the thickness of each lens group. It seems that a limit is reached at present in enhancing the refracting power of each lens group. The remaining method is one of reducing the thickness of each lens group accordingly. The requirements in miniaturization are that a change in total length is small during magnification change and that a lens located at the closest position to an object at a wide angle end has a small lens diameter so as to make a filter size as small as possible, as well as that the total length is shortened. Therefore, the most effective method for achieving the miniaturization and the cost reduction would be to reduce the number of constituent lenses in the first lens group closest to the object while reducing the thickness of the constituent lenses.

However, the zoom lens with the wide field angle of about 84° as disclosed in above Japanese Laid-open Patent Application No. 62-94812 comprises the first lens group composed of at least three lenses even with use of aspherical surface. There is known no wide angle zoom lens with a first lens group being composed of constituent lenses of less than three and with a field angle being of about 84°. A trial was made to simply remove one of the two negative lenses in the first lens group of the conventional wide angle zoom lens, but a preferable result was not obtained because of increased aberrations of distortion, astigmatism, and coma.

On the other hand, above Japanese Patent Publication No. 61-42246 and U.S. Pat. No. 4,560,253 show an example in which the first lens group is composed only of two lenses one of which is a negative lens and the other of which is a positive lens. The zoom lens as disclosed therein, however, has a relatively small field angle of about 54°–62°. Although the zoom lens as disclosed in U.S. Pat. No. 4,560,253 employs the aspherical surface, the field angle is about 62° and it is difficult to further widen the field angle. Additionally, if the refracting power of the first lens group is increased in the arrangement as disclosed, the lens performance is extremely degraded at the wide angle end, revealing a limit of miniaturization at the wide angle end.

SUMMARY OF THE INVENTION

It is an object of the present invention to provide a wide angle zoom lens, solving the above-described problems, which secures a field angle of about 84° and a variable power ratio of about 2 and in which a first lens group is composed only of two lenses of a negative lens and a positive lens, whereby achieving cost reduction and excellent image formation performance in a compact size.

To achieve the above object, a wide angle zoom lens according to the present invention comprises a first lens group and a second lens group, in which the first lens group is disposed closer to an object than the second lens group and comprises a negative meniscus lens and a positive lens in the named order from the object side, the negative meniscus lens having at least one aspherical surface and being convex on the object side, and the positive lens being convex on the object side, whereby the first lens group has a negative overall refracting power, in which the lens group comprises a plurality of lenses and has a positive overall refracting power, in which a magnification change is effected by changing an air gap between the first lens group and the second lens group, and in which when a focal length of the first lens group is $f_1$ and an axial air gap between the negative meniscus lens and the positive lens in the first lens group is $d_{1-2}$, the following condition is satisfied:

$$0.2 \leq d_{1-2}/|f_1| \leq 0.5.$$

Also, a preferable arrangement is that when the focal length of the first lens group is $f_1$ and a focal length of the second lens group is $f_2$, the second lens group is arranged to satisfy the following condition:

$$0.7 \leq f_2/|f_1| \leq 1.2.$$

Further, another preferable arrangement is that when the focal length of the first lens group is $f_1$, a focal length of the total system at the wide angle end is $f_w$, and a focal length of the total system at a telephoto end is $f_T$, the first lens group is arranged to satisfy the following condition:

$$0.8 < |f_1|/(f_w f_T)^{\frac{1}{2}} < 1.5.$$

Additionally, another preferable arrangement is that the second lens group comprises a plurality of positive lenses and a negative lens having a concave surface with a large curvature placed on the image side, and is arranged to satisfy the following condition:

$$0.08 \leq t_5/f_2 \leq 0.3,$$

where $t_5$ is an axial center thickness of the negative lens in the second lens group, and $f_2$ is the focal length of the second lens group.

Moreover, still another preferable arrangement is that the second lens group comprises from the object side a third positive lens, a fourth positive lens, a fifth negative lens having a concave surface with a large curvature on the image side, and a sixth positive lens, and when the maximum image height of the total lens system is y and the focal length of the total system at the wide angle end is $f_W$, the second lens group is arranged to satisfy the following condition:

$$0.7 \leq y/f_W \leq 1.05.$$

The zoom lens according to the present invention, as so arranged, has a variable power ratio of about 2 and a relatively large field angle of about 84°, while presenting an excellent image formation performance at any position between the wide angle end and the telephoto end in a compact size.

Further objects, features, and advantages of the present invention will be apparent from the detailed description as described below with reference to the accompanying drawings.

DESCRIPTION OF THE PREFERRED EMBODIMENTS

Figures 1A, 1B, 1C:
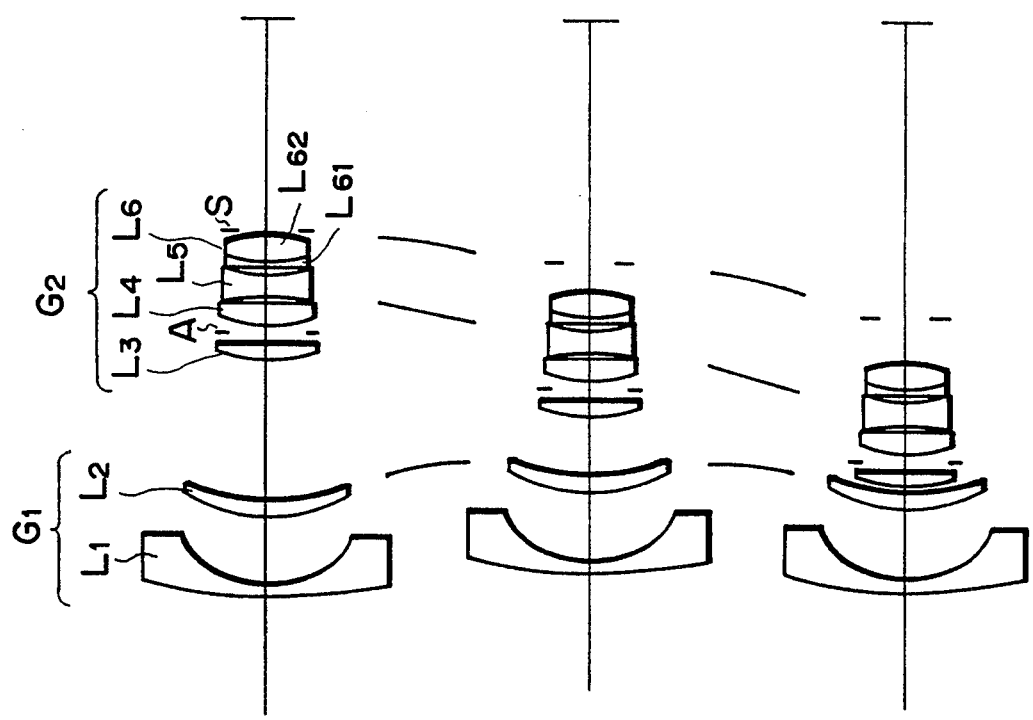
FIG. 1A, FIG. 1B, and FIG. 1C are lens constitution drawings to show a lens constitution of a first embodiment according to the present invention and states of respective lens groups during magnification change.

Embodiments of the present invention will be explained in detail with reference to the accompanying drawings.

FIGS. 1A–1C to FIGS. 3A–3C are lens constitution drawings to show the first embodiment, the second embodiment, and the third embodiment according to the present invention. In either of the embodiments, a zoom lens has a first lens group $G_1$ with a negative overall refracting power and a second lens group $G_2$ with a positive overall refracting power disposed in the named order from the object side, in which a magnification change is effected by changing an air gap between the first lens group $G_1$ and the second lens group $G_2$. The first lens group $G_1$ comprises a first negative meniscus lens $L_1$ having an aspherical surface on at least one plane thereof and being convex on the object side and a second positive lens $L_2$ being convex on the object side, which are disposed in the named order from the object side. The second lens group $G_2$ comprises a third positive lens $L_3$, a fourth positive lens $L_4$, a fifth negative lens $L_5$ having a concave surface with a large curvature on the image side, and a sixth positive lens $L_6$ disposed in the named order from the object side. When a focal length of the first lens group $G_1$ is defined as $f_1$ and an axial air gap is $d_{1-2}$ between the first negative meniscus lens $L_1$ and the second positive lens $L_2$ in the first lens group, the following condition is satisfied:

$$0.2 \leq d_{1-2}/|f_1| \leq 0.5 \tag{1}$$

Also, when the focal length of the first lens group $G_1$ is $f_1$ and a focal length of the second lens group $G_2$ is $f_2$, the second lens group $G_2$ is arranged to satisfy the following condition:

$$0.7 \leq f_2/|f_1| \leq 1.2 \tag{2}$$

Further, when the focal length of the first lens group $G_1$ is $f_1$, a focal length of the total system at a wide angle end is $f_W$, and a focal length of the total system at a telephoto end is $f_T$, the first lens group $G_1$ is arranged to satisfy the following condition:

$$0.8 < |f_1/(f_W \cdot f_T)^{\frac{1}{2}}| < 1.5 \tag{3}$$

Also, when the focal length of the second lens group $G_2$ is $f_2$ and an axial center thickness of the fifth negative lens $L_5$ having the concave surface with large curvature on the image side in the second lens group $G_2$ is $t_5$, the second lens group $G_2$ is arranged to satisfy the following condition:

$$0.08 < t_5/f_2 \leq 0.3 \tag{4}$$

Incidentally, in case of designing a wide angle zoom lens, the degrees of freedom of designing are mostly used up to improve the performance at the wide angle end. In other words, since it becomes more difficult to correct the off-axial aberrations, particularly, the distortion, the astigmatism, and the curvature of field as the field angle of the zoom lens increases, an excellent image formation performance can not be obtained unless most of the freedom degrees of designing are used for correction of the off-axial aberrations. Further, as the field angle increases, oblique rays at a wide field angle, specifically rays incident into each lens surface in the first lens group, increase their angles to enhance the third order aberration and higher order aberrations generated on the respective lens surfaces, requiring further freedom degrees for correction thereof. Such shortage of the design freedom degrees for correction has heretofore been complemented by increasing the number of lenses heretofore.

Thus, in case that a wide angle zoom lens was composed of two lens groups with the maximum field angle of about 84°, it has been considered that a first priority should be placed chiefly on the correction of the off-axial aberrations at the wide angle end concerning the first lens group, and that the first lens group must be composed of at least three lenses which were negative, negative, and positive, respectively, even if the aspherical surface were employed.

In the present invention, the first lens group $G_1$ is composed of two lenses one of which is a negative lens and the other of which is a positive lens, in the wide angle zoom lens having a wide field angle, as shown in FIGS. 1A–1C. Introduction of the aspherical surface is first essential for achieving this lens construction. The introduction of the aspherical surface is not simply based on such a consideration that the distortion, which was difficult to be corrected by a spherical surface, is to be corrected by the aspherical surface, as in the conventional lenses, but is intended to correct all the off-axial aberrations well in a good balance by finely and sufficiently correcting the higher order aberrations with full use of the higher order terms and the conical coefficient K of the aspherical surface while keeping a balance between the higher order aberrations and the third order aberration. Thus the employment of the aspherical surface made the superior correction of the off-axial aberrations possible even with the two lens structure.

In the present invention, the conical coefficient K is used instead of use of the aspherical coefficient terms of higher order, specifically of over the tenth order. The conical coefficient K presents an influence on coefficient terms having aspherical surface coefficients of higher than the second order, and increases its influence with the increase of the order. Accordingly, the conical coefficient K gives the influence on the aspherical coefficient terms after the tenth order, and has the same effect at appearance without higher order terms as seen in a case having the higher order terms, which is efficient in designing and is easily employed.

In order to obtain a more excellent image formation performance while employing the aspherical surface in the first lens group $G_1$ as described above, an air gap is first important between the negative lens $L_1$ and the positive lens $L_2$ in the first lens group $G_1$.

The condition (16t) defines the air gap between the negative meniscus lens $L_1$ and the positive lens $L_2$ in the first lens group $G_1$. As described above, the first lens group $G_1$ is composed of two lenses of the negative lens and the positive lens, and then the air gap is appropriately set to give the first lens group $G_1$ a moderate thickness, whereby the image formation performance is improved. Above the upper limit of the condition (1), the first lens group $G_1$ becomes extremely thick so as to increase its size greatly, which undesirably results in a great increase of the entire lens system. Also, a magnification change distance between the first lens group $G_1$ and the second lens group $G_2$ decreases, so that there would be undesirably caused a mechanical interference between the first lens group $G_1$ and the second lens group $G_2$. Conversely, below the lower limit of the condition (1), the first lens group $G_1$ becomes extremely thin, and, at the focal lengths of the respective lens groups as set by the next conditions (2) and (3), the correction of lower coma and astigmatism undesirably becomes difficult especially on the wide angle side. If the lower limit is set over 0.22, the advantage of the present invention would be enhanced.

The second importance is a balance of refracting power between the first lens group $G_1$ and the second lens group $G_2$. Specifically, since the first lens group $G_1$ is composed of the extremely reduced number of constituent lenses, a problem would be caused on aberration correction if the first lens group $G_1$ should have a strong refracting power. Conversely, if the first lens group $G_1$ should have a weak refracting power, a lens diameter thereof would become larger so as undesirably to increase a size of a filter therefor. Further, the refracting power of the second lens group $G_2$ is also important similarly as in the first lens group $G_1$. The first lens group $G_1$ chiefly performs the correction of off-axial aberrations at the wide angle end where the field angle is wide, while the second lens group $G_2$ chiefly performs the aberration correction on the telephoto side and the correction of axial aberrations. Therefore, a suitable balance of refracting power is to be established between the both lens groups $G_1$ and $G_2$.

Also, in order that the first lens group $G_1$ is composed of the extremely reduced number of constituent lenses, that is, two lenses, a suitable balance of refracting power is to be made between the negative lens $L_1$ and the positive lens $L_2$, a suitable glass material must be selected for each thereof, and the first lens group $G_1$ must have a moderate thickness.

Generally, when a zoom lens composed of two lens groups is arranged to satisfy the following relation:

$$f_1 = -(f_w f_T)^{\frac{1}{2}} \qquad (a),$$

where $f_w$ is the focal length at the wide angle end, $f_T$ the focal length at the telephoto end, and $f_1$ the focal length of the first lens group $G_1$, the total length at the wide angle end becomes equal to that at the telephoto end, presenting the minimum change of the entire length during magnification change. It is not preferable to select the focal length $f_1$ of the first lens group $G_1$ greatly off the above relation, because the change of the entire length would greatly increase during magnification change.

Moreover, when $\beta_T$ is a magnification of the second lens group $G_2$ which is a converging group on the telephoto side, the following relation stands:

$$f_T = f_1 \cdot \beta_T \qquad (b).$$

The second lens group $G_2$ needs be used exceeding the magnification of unity on the telephoto side in order to achieve the miniaturization, and the lens groups will be used with relatively strong refracting powers to satisfy the above relations (a) and (b) in order to effect the further superior aberration correction. The conventional trend was to make the respective lens groups composed of numerous lenses, which resulted in an increase of thickness of the lens groups. The advantage of miniaturization was thus negatively affected.

Different from the conventional techniques, the present invention provided a wide angle zoom lens, in which a balance of refracting power is set suitable for miniaturization, taking into account the above relations (a) and (b), in which the first lens group $G_1$, which is a diverging lens group, is composed of two lenses of the negative lens $L_1$ and the positive lens $L_2$, and which is compact, less in change of total length during magnification change, small in front lens diameter, and excellent in cost performance.

The condition (2) defines a proper ratio of the focal lengths of the first lens group $G_1$ and the second lens group $G_2$. Since the focal length of the first lens group $G_1$ will be set by the following condition (3), the condition (2) mainly defines the focal length of the second lens group $G_2$.

There are the following two cases (i) and (ii) above the upper limit of the condition (2):
(i) A case that the focal length of the first lens group $G_1$ is extremely small; and
(ii) A case that the focal length of the second lens group $G_2$ is extremely large.

In the case (i), the total length becomes extremely long at the telephoto end, which is not preferable for the same reason as in a case below the lower limit of the next condition (3). In contrast, in the case (ii), a movement amount of the second lens group $G_2$ increases during magnification change to increase the change of the total length and to make the axial air gap, which varies in magnification change, between the first lens group $G_1$ and the second lens group $G_2$ (as will be referred to as magnification change distance) too small on the telephoto end side, which could undesirably cause the mechanical interference between the first lens group $G_1$ and the second lens group $G_2$.

In contrast, there are the following two cases (iii) and (iv) below the lower limit of the condition (2):
(iii) A case that the focal length of the first lens group $G_1$ is extremely large; and
(iv) A case that the focal length of the second lens group $G_2$ is extremely small.

In the case (iii), the total length becomes extremely long at the wide angle end, which is not preferable for the same reason as in a case above the upper limit of the next condition (3). On the other hand, in case (iv), the refracting power of the second lens group $G_2$ becomes too strong, undesirably causing shortage of back focus. Also as a problem of aberrations, the correction of spherical aberration and the correction of upper coma become difficult especially on the telephoto side, resulting in failure of achievement of aperture diameter to be obtained in the present invention. Further, if the lower limit is set over 0.77, the advantage of the present invention would be more enhanced.

The condition (3) is an equation concerning the change of the total length in the entire range of magnification change as described. This condition shows that the total length becomes maximum at the wide angle end in case of a value of not less than 1.0 while the total length becomes maximum at the telephoto end in case of a value of less more than 1.0. Above the upper limit of the condition (3), the total length becomes extremely large at the wide angle end to increase the front lens diameter, which undesirably increases the filter size. Also, the entire lens system becomes larger and the movement amount upon focusing increases, which would undesirably decrease the focusing speed in case of use in autofocus. If the miniaturization should be imposed on such a lens while reducing the front lens diameter, the brightness of the edge of image field would undesirably become insufficient. Further, if the upper limit is to be set not more than 1.3, the effect of miniaturization would be enhanced. Conversely, below the lower limit of the condition (3), the total length would be extremely long at the telephoto end to make miniaturization in design of lens barrel difficult. The total length is comparatively short at the wide angle end, which is advantageous in reducing the front lens diameter and in keeping the brightness of the edge of image field. However, it is difficult to correct the negative distortion, the astigmatism, and the lower coma at the wide angle end, and the Petzval's sum becomes small and out of a proper range, undesirably resulting in degradation of curvature of field. Moreover, it also undesirably becomes difficult to correct the spherical aberration at the telephoto end.

The condition (4) defines the center thickness of the negative lens $L_5$ having the concave plane with a large curvature on the image side in the second lens group $G_2$. Above the upper limit of the condition (4), the negative lens $L_5$ becomes thicker so as to increase its size, undesirably. Incidentally, a thick negative lens in a second lens group in a zoom lens composed of two lens groups is generally made of a glass material having a relatively low transmittance of light of short wavelength, for example, lanthanum dense flint glass, lanthanum flint glass, dense flint glass, or the like, and, therefore, the spectral transmittance would be undesirably lowered by the excessive increase of thickness. Conversely, below the lower limit of the condition (4), the negative lens $L_5$ becomes thinner, which undesirably makes the correction of the spherical aberration difficult especially on the telephoto side.

Additionally, as for the negative meniscus lens $L_1$ and the positive lens $L_2$ in the first lens group $G_1$, proper optical materials satisfying the following conditions must be used with the balance of refracting power as set by the condition (2):

$$1.51 < nd_1 \text{ and } 49 < vd_1 \quad (5);$$

$$1.68 < nd_2 \text{ and } 37 < vd_2 \quad (6),$$

where $nd_1$ is a refractive index of the negative meniscus lens $L_1$ in the first lens group $G_1$ for the d-line;
$vd_1$ is an Abbe's number of the negative meniscus lens $L_1$ in the first lens group $G_1$;
$nd_2$ is a refractive index of the positive lens $L_2$ in the first lens group $G_1$ for the d-line; and
$vd_2$ is an Abbe's number of the positive lens $L_2$ in the first lens group $G_1$.

(In case that a composite aspherical lens, in which a resin material is combined with a glass material, is used, the refractive index and the Abbe's number are of the matrix glass material.)

The condition (5) and the condition (6) are equations for setting proper optical materials used for the negative lens $L_1$ and the positive lens $L_2$ in the first lens group $G_1$.

If the Abbe's number $vd_1$ in the condition (5) should not be satisfied, the chromatic aberration of magnification could not be corrected, and the lower coma differing depending upon wavelength (as will be referred to as chromatic coma) increases at the wide end undesirably. If the condition of the refractive index $nd_1$ should not be satisfied, the Petzval's sum would become extremely small to extremely degrade the curvature of field, which could not be corrected. If the condition of the Abbe's number $vd_2$ should not be satisfied in the condition (6), the correction of the chromatic aberration of magnification would undesirably become difficult. If the condition of the refractive index $nd_2$ should not be satisfied, the corrections of the lower coma and the spherical aberration would undesirably become negatively affected.

To satisfy the following conditions is more preferable in order to further enhance the effect of the present invention:

$$1 < f_2/f_W < 1.5 \quad (7);$$

$$0.7 \leq y/f_W \leq 1.05 \quad (8);$$

$$0.15 \leq n_{61} - n_{62} \leq 0.35 \quad (9),$$

where $y$ is a maximum image height of the entire lens system;
$n_{61}$ is a refractive index of the negative lens $L_{61}$ in the compound positive lens $L_6$ in the second lens group $G_2$ for the d-line;
$n_{62}$ is a refractive index of the positive lens $L_{62}$ in the compound positive lens $L_6$ in the second lens group $G_2$ for the d-line;
$f_2$ is the focal length of the second lens group $G_2$; and $f_W$ is the focal length of the entire system at the wide angle end.

The condition (7) is a condition for setting the focal length of the second lens group $G_2$. Above the upper limit of the condition (7), the movement amount of the second lens group $G_2$ increases so as to make the entire system larger and to reduce a distance for magnification change, which could undesirably cause the mechanical interference between the first lens group $G_1$ and the second lens group $G_2$. Conversely, below the lower limit of the condition (7), the spherical aberration especially on the telephoto side and the upper coma increase undesirably. Further, the back focus decreases to make the lens difficult to be used for single-lens reflex camera.

Condition (8) is a condition for field angle at the wide angle end of the present invention. If the upper limit of the condition (8) should be exceeded, the focal length would be below 20 mm at the wide angle end as converted as in 35 mm camera. Then, the correction of the off-axial aberrations such as the distortion, the astigmatism, and the curvature of field could not be effected even with the arrangement of the present invention, failing to obtain the excellent performance. Conversely, below the lower limit of the condition (8), the focal length would be over 30 mm at the wide angle end as converted as in 35 mm camera. In this case, if the balance of refracting power and the construction were arranged to satisfy the conditions (1), (2) and (3) of the present invention, the refracting power of the second lens group $G_2$ would become greater, which makes the aberration correction difficult. For example, the spherical aberration would be made worse especially at the telephoto end. This is not preferable. Also, the first lens group $G_1$ becomes thicker under the condition (1), which is disadvantageous in miniaturization to be undesirably deviated from the object of the present invention.

In the present invention, it is preferable that the positive lens $L_6$ is a compound lens composed of the negative lens $L_{61}$ and the positive lens $L_{62}$. The compound lens is set on the image side in the second lens group $G_2$, which can establish an appropriate Petzval's sum, which can increase the degrees of freedom of designing, and which can increase the degrees of freedom of correction for color extinction of the chromatic aberration of magnification and the axial chromatic aberration. The condition (9) is a condition for defining a refractive index of the compound positive lens $L_6$, which is located closest to the image in the second lens group $G_2$.

Above the upper limit of the condition (9), there is no problem as to the Petzval's sum. However, if the positive lens $L_6$ has such a refracting power, the positive lens $L_{62}$ in the compound lens has an increased curvature to reduce the thickness at the periphery of the lens, which would cause a problem in production and undesirably increase the thickness of the positive lens $L_6$ as a result. Conversely, below the lower limit, the degrees of freedom for setting an appropriate Petzval's sum would be lowered to increase the curvature of field undesirably.

The lenses other than the positive lens $L_6$ closest to the image may be replaced by compound lenses to increase the degrees of freedom of designing.

Although the aspherical surface is introduced on the plane of the first negative meniscus lens $L_1$ on the image side in the present invention, the aspherical surface could be also provided in the second lens group $G_2$ to correct the spherical aberration and the upper coma and to obtain a large aperture ratio, similarly as in the conventional case with the aspherical surface.

The lens constructions and the lens shapes of the respective embodiments are determined as follows.

FIGS. 1A-1C, FIGS. 2A-2C and FIGS. 3A-3C are lens constitution drawings to show the respective lenses in the first embodiment, the second embodiment, and the third embodiment, in each of which the first lens group $G_1$ comprises the first negative meniscus lens $L_1$ having a convex surface on the object side and the second positive meniscus lens $L_2$ having a convex plane on the object side, which are disposed in this order from the object side, and the first negative meniscus lens $L_1$ has the aspherical surface on the image side. Further, the second lens group $G_2$ comprises the third positive lens $L_3$, the fourth double convex positive lens $L_4$, the fifth double concave negative lens $L_5$ having a concave plane with a large curvature on the image side, and the sixth compound positive lens $L_6$ composed of the negative meniscus lens $L_{61}$ and the double convex positive lens $L_{62}$ stuck to each other.

A stop closest to the image in the respective drawings is a constant aperture stop S, which is a so-called flare stopper, in the respective embodiments.

Figures 2A, 2B, 2C:
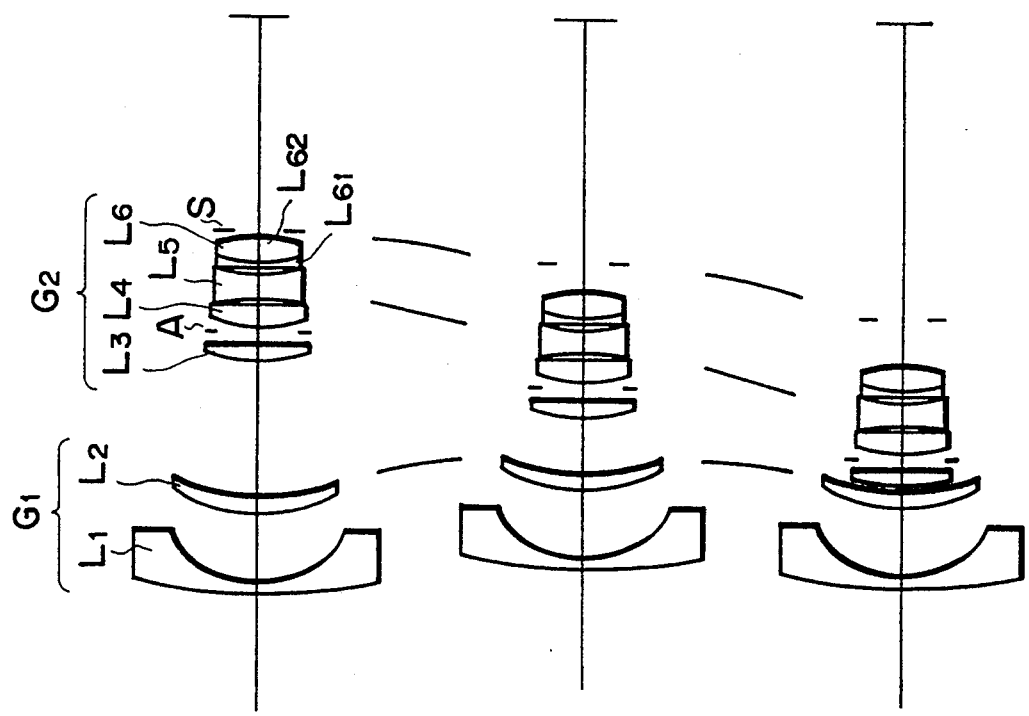
FIG. 2A, FIG. 2B, and FIG. 2C are lens constitution drawings to show a lens constitution of a second embodiment according to the present invention and states of respective lens groups during magnification change.
Figures 3A, 3B, 3C:
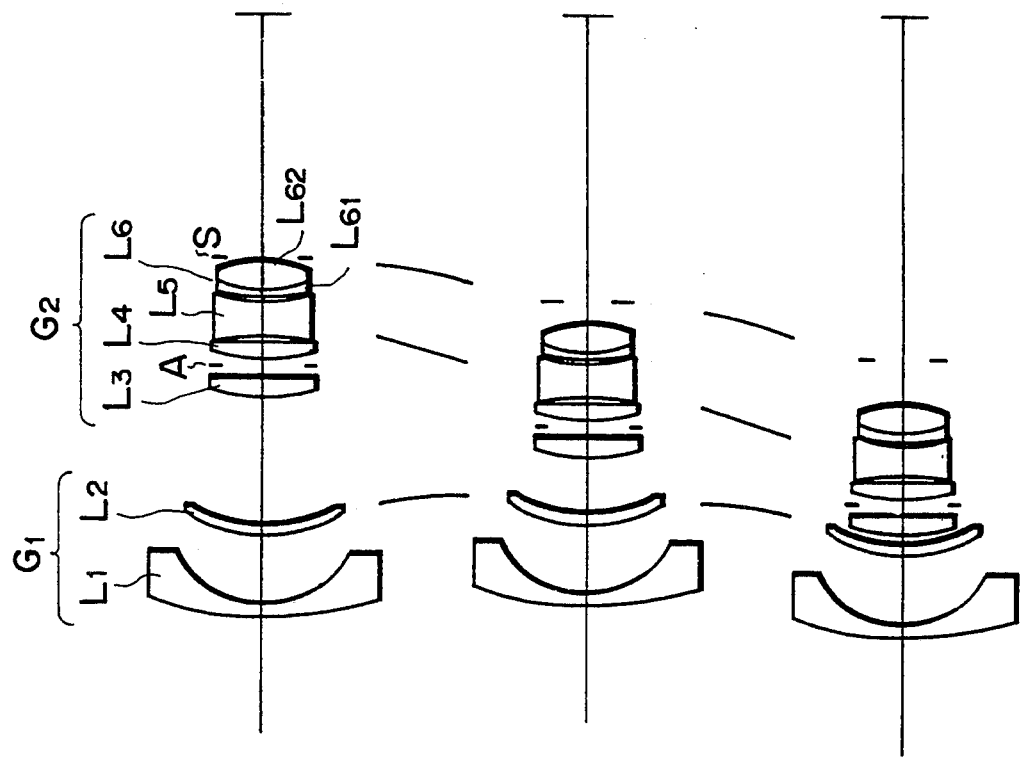
FIG. 3A, FIG. 3B, and FIG. 3C are lens constitution drawings to show a lens constitution of a third embodiment according to the present invention and states of respective lens groups during magnification change.

FIG. 1A, FIG. 2A, and FIG. 3A show lens arrangements at the wide angle end, FIG. 1B, FIG. 2B, and FIG. 3B show lens arrangements in a state of intermediate focal length, and FIG. 1C, FIG. 2C, and FIG. 3C show lens arrangements at the telephoto end, respectively.

The following Table 1 to Table 3 show specific values of the first embodiment to the third embodiment according to the present invention. In the tables to show the specific values of the embodiments, f is a focal length, $F_{NO}$ is an f-number, and $2\omega$ is a field angle. Further, numbers at the left end represent orders from the object side, r does a radius of curvature of lens surface, d a lens surface separation, n a refractive index n and $\nu$ an Abbe's number which are values for d-line ($\lambda = 587.6$ nm). In addition, D0 is a distance from the object to the lens first plane.

The aspherical surface as shown in the tables of specific values is expressed by the following equation 1 when a distance along the optical axis between an apex of each aspherical surface at a height y normal to the optical axis and the tangential plane, a paraxial radius of curvature is r, a conical constant is k, and the n-th order aspherical surface coefficient is $c_n$:

$$x = \frac{y^2/r}{1 + \{1 - (ky^2/r^2)\}^{1/2}} + c_2 y^2 + c_4 y^4 + c_6 y^6 + c_8 y^8 + c_{10} y^{10} \qquad \text{Equation 1}$$

TABLE 1

(EMBODIMENT 1)

f = 24.7–48.5
$2\omega$ = 84.4–47.9°
$F_{NO}$ = 3.6–4.6

| | r | d | $\nu$ | n |
|---|---|---|---|---|
| 1 | 91.163 | 1.80 | 60.0 | 1.64000 |
| 2 | 16.351 | 12.33 | | |
| 3 | 23.425 | 3.00 | 25.5 | 1.80458 |
| 4 | 29.572 | (d4) | | |
| 5 | 26.691 | 3.00 | 42.0 | 1.66755 |
| 6 | −452.851 | 3.00 | | |
| 7 | 21.859 | 4.00 | 50.2 | 1.72000 |
| 8 | −335.716 | .50 | | |
| 9 | −47.060 | 4.50 | 23.0 | 1.86074 |
| 10 | 18.585 | .90 | | |
| 11 | 68.945 | 1.20 | 43.3 | 1.84042 |

TABLE 1-continued

| 12 | 21.066  | 4.50  | 35.5 | 1.59507 |
|----|---------|-------|------|---------|
| 13 | −20.536 | (d13) |      |         |
| 14 | .000    | (d14) |      |         |

Variable distances in magnification change

| f   | 24.7000 | 35.0000 | 48.5000 |
|-----|---------|---------|---------|
| D0  | ∞       | ∞       | ∞       |
| d4  | 24.4705 | 10.4622 | 1.1112  |
| d13 | .0000   | 5.0000  | 8.0000  |
| d14 | 38.3706 | 42.2165 | 50.8108 |

Shape of aspherical surface of second plane
$k = 0.7750$
$c_2 = 0.48718 \times 10^{-2}$
$c_4 = 0.31467 \times 10^{-5}$
$c_6 = -0.10472 \times 10^{-7}$
$c_8 = 0.37717 \times 10^{-10}$
$c_{10} = -0.25516 \times 10^{-12}$ The following shows values corresponding to the conditions, of the above lens data.

(1) $d_{1-2}/|f_1| = 0.334$
(2) $f_2/|f_1| = 0.859$
(3) $|f_1|/(f_w \cdot f_T)^{\frac{1}{2}} = 1.07$
(4) $t_5/f_2 = 0.142$
(5) $vd_1 = 60.0$
    $nd_1 = 1.640$
(6) $vd_2 = 25.5$
    $nd_2 = 1.805$
(7) $f_2/f_w = 1.287$
(8) $y/f_w = 0.874$
(9) $n_{61} - n_{62} = 0.245$

TABLE 2
(EMBODIMENT 2)

$f = 24.7 - 48.5$
$2\omega = 84.3 - 47.6°$
$F_{NO} = 3.6 - 4.6$

|    | r        | d     | v    | n       |
|----|----------|-------|------|---------|
| 1  | 106.309  | 1.80  | 60.0 | 1.64000 |
| 2  | 17.850   | 10.59 |      |         |
| 3  | 24.351   | 3.00  | 25.5 | 1.80458 |
| 4  | 33.427   | (d4)  |      |         |
| 5  | 28.919   | 3.00  | 45.0 | 1.74400 |
| 6  | −466.108 | 3.00  |      |         |
| 7  | 21.988   | 4.00  | 50.2 | 1.72000 |
| 8  | −90.342  | .40   |      |         |
| 9  | −41.802  | 4.50  | 23.0 | 1.86074 |
| 10 | 19.621   | 1.10  |      |         |
| 11 | 128.003  | 1.20  | 43.3 | 1.84042 |
| 12 | 17.045   | 4.50  | 35.5 | 1.59507 |
| 13 | −19.767  | (d13) |      |         |
| 14 | .000     | (d14) |      |         |

Variable distances in magnification change

| f   | 24.7000 | 35.0000 | 48.5000 |
|-----|---------|---------|---------|
| D0  | ∞       | ∞       | ∞       |
| d4  | 24.0840 | 11.0961 | 1.0914  |
| d13 | 0.0000  | 4.5000  | 8.0000  |
| d14 | 35.8394 | 39.4375 | 46.5517 |

Shape of aspherical surface of second plane
$k = 0.8000$
$c_2 = 0.64786 \times 10^{-2}$
$c_4 = 0.62265 \times 10^{-5}$
$c_6 = -0.45025 \times 10^{-8}$
$c_8 = 0.40713 \times 10^{-10}$
$c_{10} = -0.87527 \times 10^{-13}$ The following shows values corresponding to the conditions, of the above lens data.

(1) $d_{1-2}/|f_1| = 0.265$
(2) $f_2/|f_1| = 0.786$
(3) $|f_1|/(f_w \cdot f_T)^{\frac{1}{2}} = 1.156$
(4) $t_5/f_2 = 0.143$
(5) $vd_1 = 60.0$
    $nd_1 = 1.640$
(6) $vd_2 = 25.5$
    $nd_2 = 1.805$
(7) $f_2/f_w = 1.273$
(8) $y/f_w = 0.874$
(9) $n_{61} - n_{62} = 0.245$

TABLE 3
(EMBODIMENT 3)

$f = 24.7 - 48.5$
$2\omega = 84.4 - 48.3°$
$F_{NO} = 3.5 - 4.5$

|    | r        | d     | v    | n       |
|----|----------|-------|------|---------|
| 1  | 61.023   | 1.80  | 55.6 | 1.69680 |
| 2  | 14.836   | 12.33 |      |         |
| 3  | 21.172   | 2.60  | 23.0 | 1.86074 |
| 4  | 25.206   | (d4)  |      |         |
| 5  | 27.871   | 3.50  | 37.9 | 1.72342 |
| 6  | 269.269  | 3.30  |      |         |
| 7  | 29.543   | 3.00  | 47.5 | 1.78797 |
| 8  | −251.274 | .80   |      |         |
| 9  | −39.853  | 6.00  | 23.0 | 1.86074 |
| 10 | 23.830   | .70   |      |         |
| 11 | 35.131   | 1.20  | 46.5 | 1.80411 |
| 12 | 15.328   | 5.00  | 41.4 | 1.57501 |
| 13 | −20.671  | (d13) |      |         |
| 14 | .000     | (d14) |      |         |

Variable distances in magnification change

| f   | 24.7000 | 35.0000 | 48.5000 |
|-----|---------|---------|---------|
| D0  | ∞       | ∞       | ∞       |
| d4  | 22.3784 | 9.6394  | 1.1355  |
| d13 | .0617   | 4.0617  | 8.0617  |
| d14 | 42.8844 | 48.9972 | 58.2525 |

Shape of aspherical surface of second plane
$k = 0.7750$
$c_2 = 0.43415 \times 10^{-2}$
$c_4 = 0.39263 \times 10^{-5}$
$c_6 = -0.42548 \times 10^{-7}$
$c_8 = 0.19288 \times 10^{-9}$
$c_{10} = -0.95410 \times 10^{-12}$ The following shows values corresponding to the conditions, of the above lens data.

(1) $d_{1-2}/|f_1| = 0.374$
(2) $f_2/|f_1| = 0.982$
(3) $|f_1|/(f_w \cdot f_T)^{\frac{1}{2}} = 0.953$
(4) $t_5/f_2 = 0.185$
(5) $vd_1 = 55.6$
    $nd_1 = 1.697$
(6) $vd_2 = 23.0$
    $nd_2 = 1.861$
(7) $f_2/f_w = 1.312$
(8) $y/f_w = 0.874$
(9) $n_{61} - n_{62} = 0.229$ As seen from the specific values of each embodiment as described, the zoom lens of each embodiment is constructed in a compact size with the reduced number of constituent lenses.

In either of the embodiments, even though the wide field angle is achieved with the maximum field angle of about 84°, an excellent image formation performance is attained in a range from the wide angle end to the telephoto end.

In each of the embodiments, the constant aperture stop S is disposed behind the second lens group $G_2$ to effectively cut off the off-axial marginal rays, which could cause great upper coma, and is moved back and forth independently of the second lens group $G_2$. The movement of the constant aperture stop S is not limited to that, but may be any if the stop can effectively shield the upper coma. The aperture stop A is disposed between the positive lens $L_3$ and the positive lens $L_4$ in the second lens group in each of the embodiment, but it can also be set between the first lens group $G_1$ and the second lens group $G_2$ or between the positive lens $L_4$ and the negative lens $L_5$.

A third lens group having a very weak refracting power may be set in a modification based on the present invention. As far as the modification substantially includes the arrangement of the present invention, the same effects and advantages are of course enjoyed, because the modification is considered within the present invention.

The aspherical surface is employed on the glass lens in each of the embodiments, but an aspherical lens made of a composite material of a glass material and a resin material can be of course used with a minor modification of design.

According to the present invention, the wide angle zoom lens with the maximum field angle of about 84° comprises the first lens group composed of two lenses, which is compact in size, superior in performance, and excellent in cost performance.

What is claimed is:

1. A wide angle zoom lens comprising a first lens group and a second lens group:
   wherein said first lens group is disposed closer to an object than said second lens group and consists of a negative meniscus lens and a positive lens in the named order from the object side, said negative meniscus lens having at least one aspherical surface and being convex on the object side, said positive lens being convex on the object side, whereby said first lens group has a negative overall refracting power;
   wherein said second lens group comprises a plurality of lenses and has a positive overall refracting power;
   wherein a magnification change is effected by changing an air gap between said first lens group and said second lens group; and
   wherein when a focal length of said first lens group is $f_1$ and an axial air gap between said negative meniscus lens and said positive lens in said first lens group is $d_{1-2}$, the following condition is satisfied:

$$0.2 \leq d_{1-2}/|f_1| \leq 0.5.$$

2. A wide angle zoom lens according to claim 1, wherein when the focal length of said first lens group is $f_1$ and a focal length of said second lens group is $f_2$, said first lens group and said second lens group are arranged to further satisfy the following condition:

$$0.7 < f_2/|f_1| \leq 1.2.$$

3. A wide angle zoom lens according to claim 1, wherein when the focal length of said first lens group is $f_1$, a focal length of the entire system at a wide angle end is $f_W$, and a focal length of the entire system at a telephoto end is $f_T$, said first lens group is arranged to further satisfy the following condition:

$$0.8 < |f_1|/(f_W \cdot f_T)^{\frac{1}{2}} < 1.5.$$

4. A wide angle zoom lens according to claim 1, wherein said second lens group comprises a plurality of positive lenses and a negative lens having a concave plane with a large curvature on the image side, and wherein when an axial center thickness of said negative lens is $t_5$ and a focal length of said second lens group is $f_2$, said second lens group is arranged to satisfy the following condition:

$$0.08 \leq t_5/f_2 \leq 0.3.$$

5. A wide angle zoom lens according to claim 1, wherein when a refractive index of said negative meniscus lens located on the object side in said first lens group is $nd_1$ for the d-line, an Abbe's number thereof is $\nu d_1$, a refractive index of said positive lens located on the image side in said first lens group is $nd_2$ for the d-line, and an Abbe's number thereof is $\nu d_2$, said first lens group is arranged to further satisfy the following conditions:

$$1.51 < nd_1 \text{ and } 49 < \nu d_1;$$
   $$1.68 < nd_2 \text{ and } 37 < \nu d_2.$$

6. A wide angle zoom lens according to claim 1, wherein when a focal length of said second lens group is $f_2$ and a focal length of the entire system at a wide angle end is $f_W$, said second lens group is arranged to satisfy the following condition:

$$1 < f_2/f_W < 1.5.$$

7. A wide angle zoom lens according to claim 1, wherein when a focal length of the entire system at a wide angle end is $f_W$ and a maximum image height of the entire lens system is $y$, said first lens group and said second lens group are arranged to further satisfy the following condition:

$$0.15 \leq y/f_W \leq 1.05.$$

8. A wide angle zoom lens according to claim 1, wherein said second lens group is located closest to an image and comprises a compound positive lens composed of a negative lens and a positive lens stuck to each other, and wherein when a refractive index of said negative lens in said compound positive lens is $n_{61}$ for the d-line and a refractive index of said positive lens in said compound positive lens is $n_{62}$ for the d-line, the following condition is satisfied:

$$0.15 \leq n_{61} - n_{62} \leq 0.35.$$

9. A wide angle zoom lens according to claim 1, wherein said first lens group is arranged to further satisfy the following condition:

$$0.22 \leq d_{1-2}/|f_1| \leq 0.5,$$

where $d_{1-2}$ is an axial air gap between said negative meniscus lens and said positive lens in said first lens group; and
   $f_1$ is the focal length of the first lens group.

10. A wide angle zoom lens according to claim 2, wherein said second lens group is arranged to further satisfy the following condition:

$$0.77 \leq f_2/|f_1| \leq 1.2,$$

where $f_1$ is the focal length of the first lens group; and $f_2$ is the focal length of the second lens group.

11. A wide angle zoom lens according to claim 3, wherein said first lens group is arranged to further satisfy the following condition:

$$0.8 \leq |f_1|/(f_W \cdot f_T)^{\frac{1}{2}} < 1.3,$$

where $f_1$ is the focal length of the first lens group;
$f_W$ is the focal length of the entire system at the wide angle end; and
$f_T$ is the focal length of the entire system at the telephoto end.

12. A wide angle zoom lens according to claim 1, wherein said first lens group comprises a first negative meniscus lens having an aspherical surface on the image side and being convex on the object side, and a second positive meniscus lens being convex on the object side, which are disposed in the named order from the object side, and wherein said second lens group comprises a third positive lens, a fourth double convex positive lens, a fifth double concave negative lens having a concave surface with a large curvature on the image side, and a sixth compound positive lens composed of a negative meniscus lens and a double convex lens stuck to each other, which are disposed in the named order from the object side.

13. A wide angle zoom lens according to claim 1, which is structured according to the following data table:

f=24.7–48.5

2ω=84.4°–47.9°

$F_{NO}$=3.6–4.6

| | r | d | ν | n |
|---|---|---|---|---|
| 1 | 91.163 | 1.80 | 60.0 | 1.64000 |
| 2 | 16.351 | 12.33 | | |
| 3 | 23.425 | 3.00 | 25.5 | 1.80458 |
| 4 | 29.572 | (d4) | | |
| 5 | 26.691 | 3.00 | 42.0 | 1.66755 |
| 6 | −452.851 | 3.00 | | |
| 7 | 21.859 | 4.00 | 50.2 | 1.72000 |
| 8 | −335.716 | .50 | | |
| 9 | −47.060 | 4.50 | 23.0 | 1.86074 |
| 10 | 18.585 | .90 | | |
| 11 | 68.945 | 1.20 | 43.3 | 1.84042 |
| 12 | 21.066 | 4.50 | 35.5 | 1.59507 |
| 13 | −20.536 | (d13) | | |
| 14 | .000 | (d14) | | |

Variable distances in magnification change

| f | 24.7000 | 35.0000 | 48.5000 |
|---|---|---|---|
| D0 | ∞ | ∞ | ∞ |
| d4 | 24.4705 | 10.4622 | 1.1112 |
| d13 | .0000 | 5.0000 | 8.0000 |
| d14 | 38.3706 | 42.2165 | 50.8108 |

Shape of aspherical surface of second plane
k=0.7750
c2=0.48718×10$^{-2}$
c4=0.31467×10$^{-5}$
c6=−0.10472×10$^{-7}$
c8=0.37717×10$^{-10}$
c10=−0.25516×10$^{-12}$ (1) $d_{1-2}/|f_1|$ = 0.334
(2) $f_2/|f_1|$ = 0.859
(3) $|f_1|/(f_w \cdot f_T)^{\frac{1}{2}}$ = 1.07
(4) $t_5/f_2$ = 0.142
(5) $\nu d_1$ = 60.0
     $nd_1$ = 1.640

(6) $\nu d_2$ = 25.5
    $nd_2$ = 1.805
(7) $f_2/f_w$ = 1.287
(8) $y/f_w$ = 0.874
(9) $n_{61} - n_{62}$ = 0.245

In the above table of specific values, f is a focal length, $F_{NO}$ is an f-number, and 2ω is a field angle; further, numbers at the left end represent orders counted from the object side, r a radius of curvature of lens plane, d a lens surface separation, n a refractive index and ν an Abbe's number for d-line (λ=587.6 nm);

the aspherical surface as shown in the table of specific values is expressed by the following equation 1 when a distance along the optical axis between an apex of each aspherical surface at a height y normal to the optical axis and the tangential plane, a paraxial radius of curvature is r, a conical constant is k, and the n-th order aspherical surface coefficient is $c_n$:

$$x = \frac{y^2/r}{1 + \{1 - (ky^2/r^2)\}^{1/2}} + c_2 y^2 + c_4 y^4 + c_6 y^6 + c_8 y^8 + c_{10} y^{10}; \quad \text{Equation 1}$$

wherein D0 is a distance between an object and a lens first plane;
$f_2$ is a focal length of the second lens group;
$f_W$ is a focal length of the entire system at a wide end;
$f_T$ is a focal length of the entire system at a telephoto end;
$t_5$ is an axial center thickness of the negative lens in the second lens group;
y is a maximum image height of the entire lens system;
$nd_1$ is a refractive index of the negative meniscus lens located on the object side in the first lens group for the d-line;
$nd_2$ is a refractive index of the positive lens located on the image side in the first lens group for the d-line;
$\nu d_1$ is an Abbe's number of the negative meniscus lens located on the object side in the first lens group for the d-line;
$\nu d_2$ is an Abbe's number of the positive lens located on the image side in the first lens group for the d-line;
$n_{61}$ is a refractive index of the negative lens in the compound positive lens for the d-line; and
$n_{62}$ is a refractive index of the positive lens in the compound positive lens for the d-line.

14. A wide angle zoom lens according to claim 1, which is structured according to the following data table:

f=24.7–48.5

2ω=84.3°–47.6°

$F_{NO}$=3.6–4.6

| | r | d | ν | n |
|---|---|---|---|---|
| 1 | 106.309 | 1.80 | 60.0 | 1.64000 |
| 2 | 17.850 | 10.59 | | |
| 3 | 24.351 | 3.00 | 25.5 | 1.80458 |
| 4 | 33.427 | (d4) | | |
| 5 | 28.919 | 3.00 | 45.0 | 1.74400 |
| 6 | −466.108 | 3.00 | | |

-continued

| | | | | |
|---|---|---|---|---|
| 7 | 21.988 | 4.00 | 50.2 | 1.72000 |
| 8 | −90.342 | .40 | | |
| 9 | −41.802 | 4.50 | 23.0 | 1.86074 |
| 10 | 19.621 | 1.10 | | |
| 11 | 128.003 | 1.20 | 43.3 | 1.84042 |
| 12 | 17.045 | 4.50 | 35.5 | 1.59507 |
| 13 | −19.767 | (d13) | | |
| 14 | .000 | (d14) | | |

Variable distances in magnification change

| f | 24.7000 | 35.0000 | 48.5000 |
|---|---|---|---|
| D0 | ∞ | ∞ | ∞ |
| d4 | 26.0840 | 11.0961 | 1.0914 |
| d13 | 0.0000 | 4.5000 | 8.0000 |
| d14 | 35.8394 | 39.4375 | 46.5517 |

Shape of aspherical surface of second plane
k=0.8000
$c_2 = 0.64786 \times 10^{-2}$
$c_4 = 0.62265 \times 10^{-5}$
$c_6 = -0.45025 \times 10^{-8}$
$c_8 = 0.40713 \times 10^{-10}$
$c_{10} = -0.87527 \times 10^{-13}$ (1) $d_{1-2}/|f_1| = 0.265$
(2) $f_2/|f_1| = 0.786$
(3) $|f_1|/(f_w \cdot f_T)^{\frac{1}{2}} = 1.156$
(4) $t_5/f_2 = 0.143$
(5) $\nu d_1 = 60.0$
    $nd_1 = 1.640$
(6) $\nu d_2 = 25.5$
    $nd_2 = 1.805$
(7) $f_2/f_w = 1.273$
(8) $y/f_w = 0.874$
(9) $n_{61} - n_{62} = 0.245$ In the above table of specific values, f is a focal length, $F_{NO}$ is an f-number, and $2\omega$ is a field angle; further, numbers at the left end represent orders counted from the object side, r a radius of curvature of lens plane, d a lens surface separation, n a refractive index and $\nu$ an Abbe's number for d-line ($\lambda = 587.6$ nm);

the aspherical surface as shown in the table of specific values is expressed by the following equation 1 when a distance along the optical axis between an apex of each aspherical surface at a height y normal to the optical axis and the tangential plane, a paraxial radius of curvature is r, a conical constant is k, and the n-th order aspherical surface coefficient is $c_n$:

$$x = \frac{y^2/r}{1 + \{1 - (ky^2/r^2)\}^{1/2}} + c_2 y^2 + c_4 y^4 + c_6 y^6 + c_8 y^8 + c_{10} y^{10}; \quad \text{Equation 1}$$

wherein D0 is a distance between an object and a lens first plane;

$f_2$ is a focal length of the second lens group;

$f_W$ is a focal length of the entire system at a wide end;

$f_T$ is a focal length of the entire system at a telephoto end;

$t_5$ is an axial center thickness of the negative lens in the second lens group;

y is a maximum image height of the entire lens system;

$nd_1$ is a refractive index of the negative meniscus lens located on the object side in the first lens group for the d-line;

$nd_2$ is a refractive index of the positive lens located on the image side in the first lens group for the d-line;

$\nu d_1$ is an Abbe's number of the negative meniscus lens located on the object side in the first lens group for the d-line;

$\nu d_2$ is an Abbe's number of the positive lens located on the image side in the first lens group for the d-line;

$n_{61}$ is a refractive index of the negative lens in the compound positive lens for the d-line; and $n_{62}$ is a refractive index of the positive lens in the compound positive lens for the d-line.

15. A wide angle zoom lens according to claim 1, which is structured according to the following data table:

f=24.7–48.5
$2\omega = 84.4° - 48.3°$
$F_{NO} = 3.5 - 4.5$

| | r | d | ν | n |
|---|---|---|---|---|
| 1 | 61.023 | 1.80 | 55.6 | 1.69680 |
| 2 | 14.836 | 12.33 | | |
| 3 | 21.172 | 2.60 | 23.0 | 1.86074 |
| 4 | 25.206 | (d4) | | |
| 5 | 27.871 | 3.50 | 37.9 | 1.72342 |
| 6 | 269.269 | 3.30 | | |
| 7 | 29.543 | 3.00 | 47.5 | 1.78797 |
| 8 | −251.274 | .80 | | |
| 9 | −39.853 | 6.00 | 23.0 | 1.86074 |
| 10 | 23.830 | .70 | | |
| 11 | 35.131 | 1.20 | 46.5 | 1.80411 |
| 12 | 15.328 | 5.00 | 41.4 | 1.57501 |
| 13 | −20.671 | (d13) | | |
| 14 | .000 | (d14) | | |

Variable distances in magnification change

| f | 24.7000 | 35.0000 | 48.5000 |
|---|---|---|---|
| D0 | ∞ | ∞ | ∞ |
| d4 | 22.3784 | 9.6394 | 1.1355 |
| d13 | .0617 | 4.0617 | 8.0617 |
| d14 | 42.8844 | 48.9972 | 58.2525 |

Shape of aspherical surface of second plane
k=0.7750
$c_2 = 0.43415 \times 10^{-2}$
$c_4 = 0.39263 \times 10^{-5}$
$c_6 = -0.42548 \times 10^{-7}$
$c_8 = 0.19288 \times 10^{-9}$
$c_{10} = -0.95410 \times 10^{-12}$ (1) $d_{1-2}/|f_1| = 0.374$
(2) $f_2/|f_1| = 0.982$
(3) $|f_1|/(f_w \cdot f_T)^{\frac{1}{2}} = 0.953$
(4) $t_5/f_2 = 0.185$
(5) $\nu d_1 = 55.6$
    $nd_1 = 1.697$
(6) $\nu d_2 = 23.0$
    $nd_2 = 1.861$
(7) $f_2/f_w = 1.312$
(8) $y/f_w = 0.874$
(9) $n_{61} - n_{62} = 0.229$ In the above table of specific values, f is a focal length, $F_{NO}$ is an f-number, and $2\omega$ is a field angle; further, numbers at the left end represent orders counted from the object side, r a radius of curvature of lens plane, d a lens surface separation, n a refractive index and $\nu$ an Abbe's number for d-line ($\lambda = 587.6$ nm);

the aspherical surface as shown in the table of specific values is expressed by the following equation 1 when a distance along the optical axis between an apex of each aspherical surface at a height y normal to the optical axis and the tangential plane, a paraxial radius of curvature is r, a conical constant is k, and the n-th order aspherical surface coefficient is $c_n$:

$$x = \frac{y^2/r}{1 + \{1 - (ky^2/r^2)\}^{1/2}} + c_2y^2 + c_4y^4 + c_6y^6 + c_8y^8 + c_{10}y^{10};$$ Equation 1 wherein D0 is a distance between an object and a lens first plane;

$f_2$ is a focal length of the second lens group;

$f_w$ is a focal length of the entire system at a wide end;

$f_T$ is a focal length of the entire system at a telephoto end;

$t_5$ is an axial center thickness of the negative lens in the second lens group;

y is a maximum image height of the entire lens system;

$nd_1$ is a refractive index of the negative meniscus lens located on the object side in the first lens group for the d-line;

$nd_2$ is a refractive index of the positive lens located on the image side in the first lens group for the d-line;

$\nu d_1$ is an Abbe's number of the negative meniscus lens located on the object side in the first lens group for the d-line;

$\nu d_2$ is an Abbe's number of the positive lens located on the image side in the first lens group for the d-line;

$n_{61}$ is a refractive index of the negative lens in the compound positive lens for the d-line; and $n_{62}$ is a refractive index of the positive lens in the compound positive lens for the d-line.

16. A wide angle zoom lens comprising a first lens group and a second lens group:

wherein said first lens group is disposed closer to an object than said second lens group and consists of a first negative meniscus lens having at least one aspherical surface and being convex on the object side and a second positive lens being convex on the object side, whereby said first lens group has a negative overall refracting power;

wherein said second lens group comprises at least a third positive lens, a fourth positive lens, a fifth negative lens having a concave surface on the image side, and a sixth positive lens, whereby said second lens group has a positive overall refracting power;

wherein a magnification change is effected by changing an air gap between said first lens group and said second lens group; and wherein when a focal length of the entire system at a wide angle end is $f_W$ and a maximum image height of an entire lens system is y, the following condition is satisfied:

$$0.7 \leq y/f_W \leq 1.05.$$

17. A wide angle zoom lens according to claim 16, wherein when a focal length of said first lens group is $f_1$ and an axial air gap between said first negative meniscus lens and said second positive lens in said first lens group is $d_{1-2}$, said first lens group is arranged to satisfy the following condition:

$$0.2 \leq d_{1-2}/|f_1/51| \leq 0.5.$$

18. A wide angle zoom lens according to claim 16, wherein when a focal length of said first lens group is $f_1$ and a focal length of said second lens group is $f_2$, said first lens group and said second lens group are arranged to further satisfy the following condition:

$$0.7 \leq f_2/|f_1| \leq 1.2.$$

19. A wide angle zoom lens according to claim 16, wherein when a focal length of said first lens group is $f_1$, the focal length of the entire system at the wide angle end is $f_W$, and a focal length of the entire system at a telephoto end is $f_T$, said first lens group is arranged to further satisfy the following condition:

$$0.8 < |f_1|/(f_W \cdot f_T)^{\frac{1}{2}} < 1.5.$$

20. A wide angle zoom lens according to claim 16, wherein when an axial center thickness of said fifth negative lens having the concave surface with the large curvature on the image side in said second lens group is $t_5$ and a focal length of said second lens group is $f_2$, said second lens group is arranged to satisfy the following condition:

$$0.08 \leq t_5/f_2 \leq 0.3.$$

21. A wide angle zoom lens according to claim 16, wherein when a refractive index of said first negative meniscus lens located on the object side in said first lens group is $nd_1$ for the d-line, an Abbe's number thereof is $\nu d_1$, a refractive index of said second positive lens located on the image side is $nd_2$ for the d-line, and an Abbe's number thereof is $\nu d_2$, said first lens group is arranged to further satisfy the following conditions:

$$1.51 < nd_1 \text{ and } 49 < \nu d_1;$$

$$1.68 < nd_2 \text{ and } 37 < \nu d_2.$$

22. A wide angle zoom lens according to claim 16, wherein when a focal length of said second lens group is $f_2$ and the focal length of the entire system at the wide angle end is $f_W$, said second lens group is arranged to satisfy the following condition:

$$1 < f_2/f_W < 1.5.$$

23. A wide angle zoom lens according to claim 16, wherein said sixth positive lens located closest to the image in said second lens group is a compound positive lens composed of a negative lens and a positive lens stuck to each other, and wherein when a refractive index of said negative lens in said sixth positive lens is $n_{61}$ for the d-line and a refractive index of said positive lens in said sixth positive lens is $n_{62}$ for the d-line, the following condition is satisfied:

$$0.15 \leq n_{61} - n_{62} \leq 0.35.$$

24. A wide angle zoom lens according to claim 17, wherein said first lens group is arranged to further satisfy the following condition:

$$0.22 \leq d_{1-2}/|f_1| \leq 0.5,$$

where $d_{1-2}$ is an axial air gap between said negative meniscus lens and said positive lens in said first lens group; and $f_1$ is the focal length of said first lens group.

25. A wide angle zoom lens according to claim 18, wherein said second lens group is arranged to further satisfy the following condition:

$$0.77 \leq f_2/|f_1| \leq 1.2,$$

where $f_1$ is the focal length of said first lens group; and $f_2$ is a focal length of said second lens group.

26. A wide angle zoom lens according to claim 19, wherein said first lens group is arranged to further satisfy the following condition:

$$0.8 < |f_1|/(f_W \cdot f_T)^{\frac{1}{2}} < 1.3,$$

where $f_1$ is the focal length of said first lens group;
$f_W$ is the focal length of the entire system at the wide angle end; and
$f_T$ is the focal length of the entire system at the telephoto end.

* * * * *